United States Patent [19]

Kalajainen

[11] Patent Number: 5,132,967
[45] Date of Patent: Jul. 21, 1992

[54] SINGLE COMPETITOR ARBITRATION SCHEME FOR COMMON BUS

[75] Inventor: Dennis M. Kalajainen, Manassas, Va.

[73] Assignee: International Business Machines Corporation, Armonk, N.Y.

[21] Appl. No.: 605,287

[22] Filed: Oct. 29, 1990

[51] Int. Cl.⁵ .............................................. H04J 3/02
[52] U.S. Cl. .................................... 370/85.2; 370/85.1
[58] Field of Search ................. 370/85.2, 85.1, 94.1; 371/11; 375/7

[56] References Cited

U.S. PATENT DOCUMENTS

| | | |
|---|---|---|
| 4,470,112 | 9/1984 | Dimmick . |
| 4,503,535 | 3/1985 | Budde et al. ........................ 371/11 |
| 4,554,628 | 11/1985 | Bell . |
| 4,620,278 | 10/1988 | Ellsworth et al. . |
| 4,669,079 | 5/1987 | Blum . |
| 4,734,909 | 3/1988 | Benett et al. ........................ 370/85 |
| 4,736,366 | 4/1988 | Rickard ............................ 370/85.1 |
| 4,756,006 | 7/1988 | Rickard .............................. 375/7 |
| 4,814,974 | 3/1989 | Narayanan et al. . |
| 4,818,985 | 4/1989 | Ikeda . |
| 4,837,682 | 6/1989 | Culler . |
| 4,878,173 | 10/1989 | Goekjian . |
| 4,901,226 | 2/1990 | Barlow . |
| 4,965,793 | 10/1990 | Polzin et al. ..................... 370/94.1 |

Primary Examiner—Douglas W. Olms
Assistant Examiner—T. Samuel
Attorney, Agent, or Firm—Mark A. Wurm

[57] ABSTRACT

The invention discloses a single competitor arbitration code for determining if only one communications module is contending for a communication data bus and gives that module access within two bus clock cycles. An aggregate code is generated by using the true and complement of the module ID. A check code for each bit is determined by adding the aggregate code for the bit and its adjacent bit. If the check code contains any zeros, then more than one module is contending for the bus. The 10-bit single arbitration scheme allows for error detection and correction on a 32-bit data bus.

8 Claims, 3 Drawing Sheets

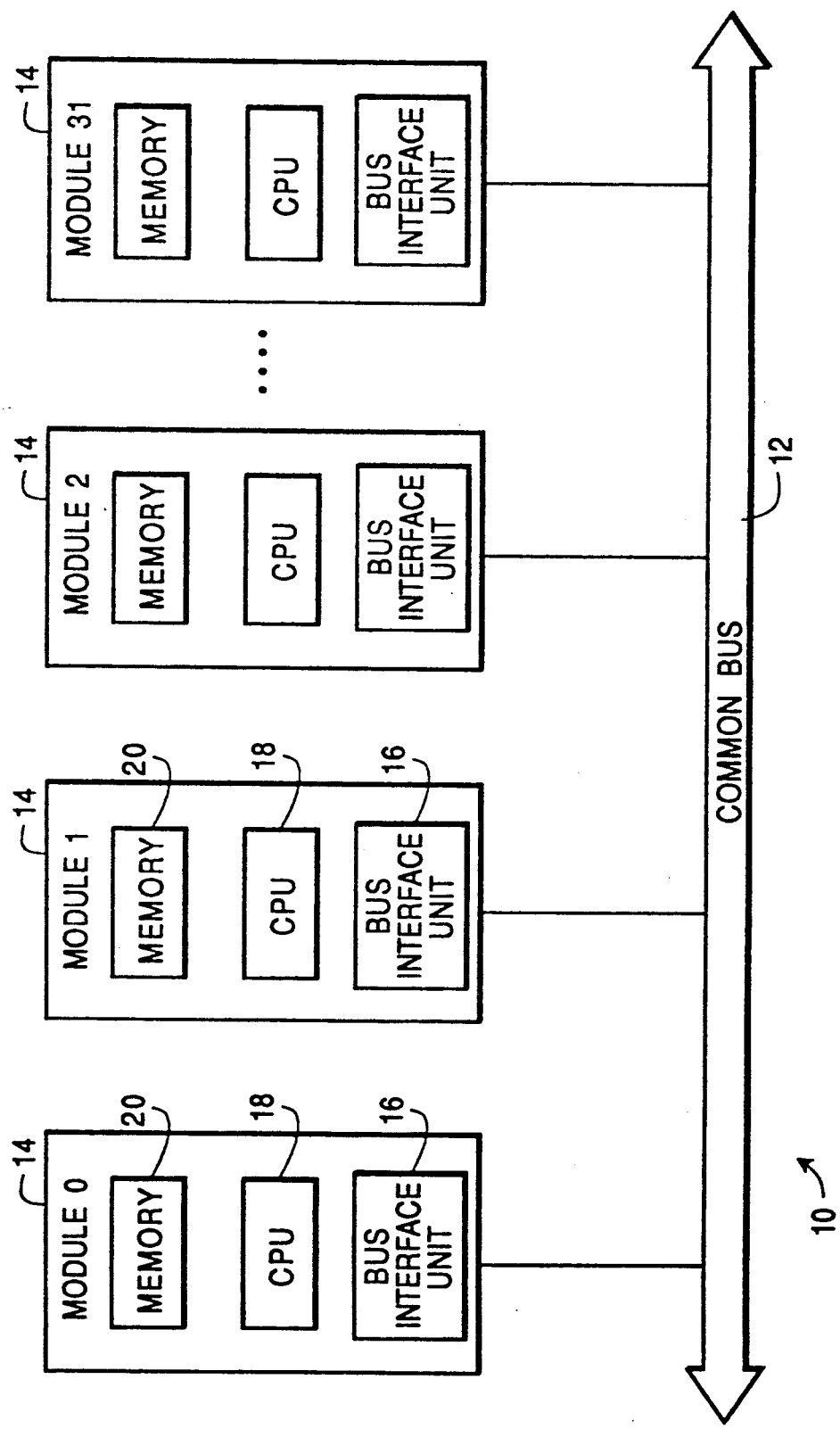

FIG. 2

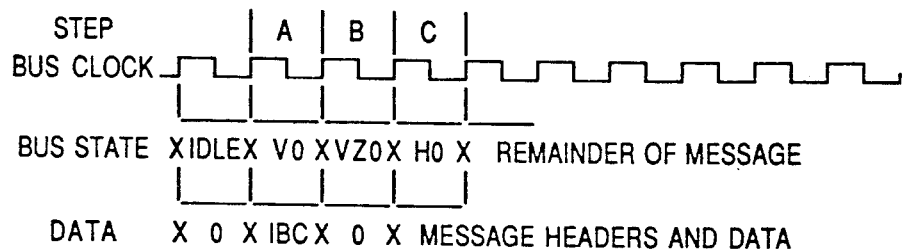

STEP A: ALL CONTENDING MODULES ASSERT IDLE BUS CODE (IBC-TRUE AND COMPL. OF ID)

STEP B: ALL MODULES DETERMINE NUMBER OF CONTENDING MODULES BY CALCULATING THE CHECK CODE AFTER RECEIVING THE AGGREGATE (WIRE-OR) IDLE BUS CODE FROM THE BUS
IF NUMBER OF CONTENDERS = 1, THEN THE WINNER OF THE VIE HAS BEEN DETERMINED AND THE VIE IS COMPLETE. THEREFORE,

STEP C: BUS STATE IS H0. WINNER BEGINS MESSAGE TRANSFER.

FIG. 3

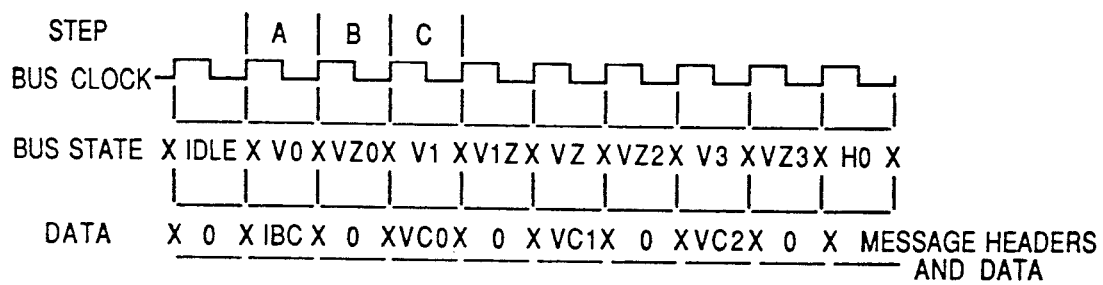

STEP A: ALL CONTENDING MODULES ASSERT IDLE BUS CODE (IBC-TRUE AND COMPL. OF ID)

STEP B: ALL MODULES DETERMINE NUMBER OF CONTENDING MODULES BY CALCULATING THE CHECK CODE AFTER RECEIVING THE AGGREGATE (WIRE-OR) IDLE BUS CODE FROM THE BUS
IF NUMBER OF CONTENDERS > 1, THEN THE WINNER OF THE VIE HAS NOT BEEN DETERMINED AND THE VIE CONTINUES. THEREFORE,

STEP C: BUS STATE IS V1. THE VIE SEQUENCE CONTINUES TO DETERMINE THE EVENTUAL WINNER. THE PI-BUS VIE SEQUENCE WILL CONTINUE FOR 6 MORE CYCLES.

VC0, VC1 AND VC2 ARE THE VIE CODES OUTPUT BY THE PI-BUS TO RESOLVE BUS MASTERSHIP BASED ON THE VIE PRIORITY REGISTER VALUES OF EACH OF THE CONTENDERS

EACH CONTENDING MODULE DETERMINES IF IT CAN CONTINUE DURING THE VZx STATES

SINGLE COMPETITOR ARBITRATION SCHEME FOR COMMON BUS

This invention was made with Government support under contract number N62269-89-C-0501 awarded by the Department of the Navy. The Government has certain rights in this invention.

BACKGROUND OF THE INVENTION

1. Technical Field

The invention disclosed broadly relates to bus communication systems and more particularly relates to the arbitration of control of the bus by contending devices desiring access to a common bus for the transfer of data.

2. Background Art

In high speed communication systems having a common bus interconnected to multiple communicating modules, latency due to arbitration of contending modules and message transfer is a serious problem. When a plurality of communicating modules vie for a common data bus simultaneously, an arbitration code is necessary to prioritize the requesting modules to select the module to receive access to the bus.

A bus acquisition system is disclosed in U.S. Pat. No. 4,736,366 to Rickard and a bus transceiver is disclosed in U.S. Pat. No. 4,756,006 to Rickard, both patents owned by the common assignee of this invention. The teachings of these two patents are herein incorporated by reference.

A typical communication system may have up to 32 communicating modules which compete for a common bus. One hundred twenty-eight logical priority levels can be ascribed to the 32 modules. The arbitration sequence, which takes place upon the data bus, requires eight bus cycles to resolve the winner's logical and physical ID. There are times when only one module is in contention for the bus. Even though it is common for only one module to be vying for the bus at any given time, that module must suffer a full eight-cycle latency of arbitration sequence.

A better technique to achieve low latency arbitration would be to add two cycles at the beginning of the arbitration sequence to determine if one or more modules are contending for control of the bus. If only one module is contending for the bus, it is not necessary to continue to the eight-cycle arbitration sequence, but give that module immediate access to the bus.

OBJECTS OF THE INVENTION

It is therefore an object of the invention to provide an improved bus arbitration system which reduces the arbitration cycle latency.

It is another object of the invention to provide a bus arbitration scheme having error detection.

It is still another object of the invention to provide an improved bus arbitration code which can be duplicated or triplicated on a 32-bit data bus to allow error detection or correction, respectively.

SUMMARY OF THE INVENTION

The present invention is a method for determining arbitration within a common bus communication system, wherein the module ID is written in true and complement form. All modules determine the number of contending modules by calculating a check code after receiving an aggregate (wire-OR) idle bus code from the bus. If the number of contenders is equal to one, then the winner of the vie has been determined and the arbitration is complete. If the number of contenders is greater than one, then the vie sequence continues to determine the eventual winner.

BRIEF DESCRIPTION OF THE DRAWINGS

The present invention, together with other and further advantages and features thereof, will be readily understood from the following detailed description when taken with the accompanying drawings.

FIG. 1 is a schematic representation of a common bus having 32 modules connected thereto.

FIG. 2 is a timing diagram of the bus clock having a single competitor arbitration code resolution.

FIG. 3 is a timing diagram for the bus having multiple module contenders.

DETAILED DESCRIPTION OF THE INVENTION

Figure 4:
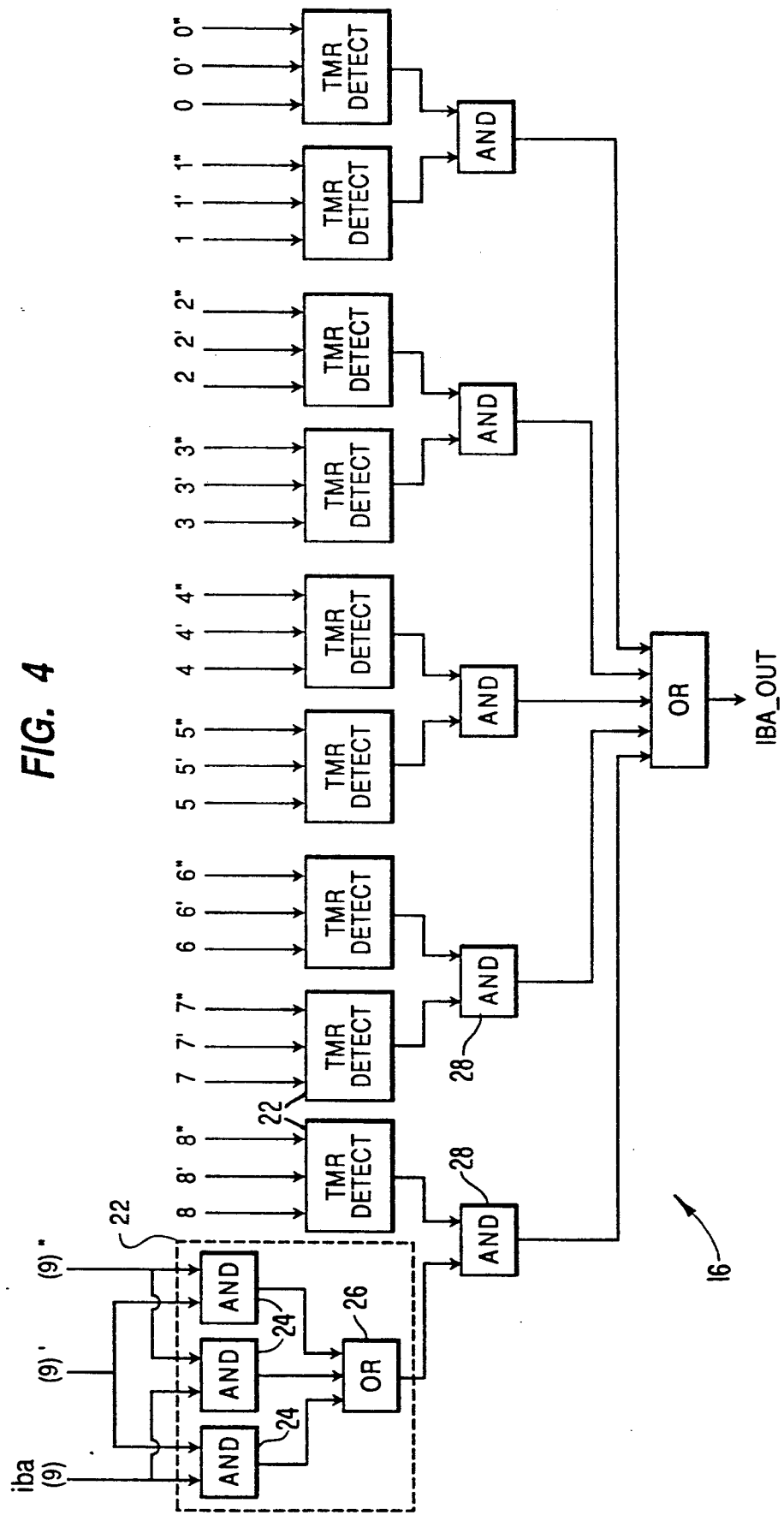
FIG. 4 is a block diagram showing an implementation of the idle bus arbitration having error correction.

Shown in FIG. 1, a communications unit 10 employs a common bus 12 and has a plurality of communicating modules 14. Each communicating module has a physical ID from zero to 31 and contains a bus interface unit (BIU) 16, a central processing unit (CPU) 18 and a memory unit 20. The BIU 16 does the interfacing between the bus and the communicating module. The central processor 18 controls the communicating module, directing the storage of data in memory unit 20 and sending it out on the common bus through the BIU 16.

When more than one module requests the bus, an arbitration code is employed to decide which contender vying for the bus receives control of the bus. A standard method for achieving this would be to force each contending module 14 to output a code of zero through 31 corresponding to its unique 5-bit physical ID. Five bits are needed to represent a number from zero to 31. The codes for each module are wire-OR'ed on the bus (low active) resulting in an aggregate arbitration code. Then the 32-bit aggregate code could be checked for the number of bits that are active. If only one bit is active, bus tenure can be transferred to the corresponding module. If greater than one bit is active, then normal arbitration techniques would be employed. However, checking this code for the number of active bits requires a large amount of logic. The logic is usually open-collector bipolar having large drive and sink current requirements. A large number of comparators are needed. Since the entire 32-bit data bus is required to source the code, error detection is difficult, if not impossible.

A better code for each contender would be as follows: for each logic 0 in the physical ID, output '01' on the bus, and for each logic 1 in the physical ID, output '10' on the bus.

This forms a true and complement of the physical module ID. Non-contenders would activate no lines on the bus. The result for a five-bit physical ID is a 10-bit single competitor arbitration code. The arbitration code is as follows:

TABLE 1

| Arbitration Code Examples | |
|---|---|
| Module ID (4 ... 0) | Arbitration Code (9 ... 0) |
| 00000 | 0101010101 |
| 00001 | 0101010110 |

TABLE 1-continued

Arbitration Code Examples

| Module ID (4...0) | Arbitration Code (9...0) |
|---|---|
| 00010 | 0101011001 |
| 00011 | 0101011010 |
| 00100 | 0101100101 |
| ... | ... |
| 11100 | 1010100101 |
| 11101 | 1010100110 |
| 11110 | 1010101001 |
| 11111 | 1010101010 |

The aggregate arbitration code is created by the wire-OR of the bus. For example, two modules are contending, module 0 has a module ID of MID=00000 and module 1 has MID=00001. The resulting aggregate code is 0101010100 as shown in Table 2.

TABLE 2

Aggregate Code Wire-OR

Module 0 outputs 0101010101
Module 1 outputs 0101010110
Aggregate code = 0101010100

A check code can be derived from the aggregate arbitration code satisfying the following equations:
- Check Code (4) = Aggregate Code (9) + Aggregate Code (8) (+ = logical OR)
- Check Code (3) = Aggregate Code (7) + Aggregate Code (6)
- Check Code (2) = Aggregate Code (5) + Aggregate Code (4)
- Check Code (1) = Aggregate Code (3) + Aggregate Code (2)
- Check Code (0) = Aggregate Code (1) + Aggregate Code (0)

If the check code contains any zeros, then more than one module is contending for the bus. Normal arbitration sequences will be required to determine the bus control. If the check code contains all ones, then the bus control can be transferred to the single competing module. Table 3 shows the result of a two competitor arbitration. Table 4 shows the result of a single competitor arbitration. Note that the check code is equal to all ones in Table 4.

TABLE 3

Two Module Competition

Module 0 code = 0101010101
Module 1 code = 0101010110
Aggregate code = 0101010100
Check code = 1 1 1 1 0

TABLE 4

Single Module Competition

Module 6 code = 0101101001 (MID = 00110)
Aggregate code = 0101101001
Check code = 1 1 1 1 1

This technique allows assignment of tenure in two cycles instead of eight cycles. The logic to check this code compared with the 1-of-32 code approach is significantly simpler and requires much less chip area and wiring bays. Shown in FIG. 2 is a clock step sequence for the two-cycle arbitration code. In step A, all contending modules assert their idle bus code of true and complement of their physical location ID. In step B, all modules determine the number of contending modules by calculating the check code after receiving the aggregate wire-OR idle bus code from the bus. If the number of contenders is equal to one, then the winner of the vie has been determined and the vie is complete. Therefore, the bus state in step C is H0 which stands for heading zero of the first message. The winner begins to transfer its message.

In FIG. 3 there is shown an arbitration vie resulting in more than one contender. In step C, a bus state is V1 (vie 1). The vie sequence continues to determine the eventual winner. Six more cycles are required.

Another feature of the invention is that since the code is compact, it can be duplicated or triplicated on a 32-bit data bus to allow error detection or correction, respectively. That is, only 10 bits are required for the single competitor arbitration code. In a 32-bit data bus, the arbitration code can be replicated three times. This is not possible with the 1-of-32 code approach since all available data bus lines are used to source the code. An additional error detection can be achieved by the generation of an error code. The error code equations are:
- Error Code (4) = Aggregate Code (9) & Aggregate Code (8) (& = logical AND)
- Error Code (3) = Aggregate Code (7) & Aggregate Code (6)
- Error Code (2) = Aggregate Code (5) & Aggregate Code (4)
- Error Code (1) = Aggregate Code (3) & Aggregate Code (2)
- Error Code (0) = Aggregate Code (1) & Aggregate Code (0)

If the error code contains any ones, then it can be assumed that an error has occurred. This is true since each pair of aggregate code bits should never contain the '11' combination. The example shown in Table 5 shows the error code.

TABLE 5

Error Code Example

Aggregate code = 0101101011
(no MID corresponds to this code)
Error code = 0 0 0 0 1

Error code correction can be done by a voting of two out of three of the triplicated idle bus arbitration logical implementation. Shown in FIG. 4 is the idle bus arbitration unit 16 having the 10-bit arbitration codes put in 10 bits 0-9. In FIG. 4, the three bits for bit 9 are first AND'ed together, then OR'ed together by OR gates 26 to form the triple modular redundant unit 22, which are AND'ed together by AND gates 28 to form the bit error correction code. These significant bits are OR'ed together to produce the error code which must equal zero if no error has occurred.

The single competitor arbitration code has applications to many different bus protocols. It can be implemented to provide extensions and enhancements to the current common bus protocols.

Although a specific embodiment of the invention has been disclosed, it will be understood by those having skill in the art that changes can be made to the specific embodiment without departing from the spirit and the scope of the invention.

What is claimed is:

1. A method of determining if only one of a plurality of communication modules is contending for access to a common data bus comprising the steps of:

generating within each communication module an aggregate code, the aggregate code comprising the true and complement of the physical identification of each communication module;

asserting by the communication module during a first clock cycle the aggregate code to the data bus;

calculating a check code from the aggregate code asserted on the data bus; and determining during a next clock cycle if the number of contending communication modules is one.

2. The method of claim 1, wherein the aggregate code is generated in duplicate to provide error detection.

3. The method of claim 1, wherein the aggregate code is generated in triplicate to provide error correction.

4. The method claim 1, wherein an error code is produced by the logical ANDing of the aggregate code.

5. A communication system having a common bus employing a single competitor arbitration code among a plurality of contending data modules comprising:

means for generating within a data module an aggregate code comprising the true and complement binary numbers of the data module's physical identification;

means for asserting the generated aggregate code on the bus on a first clock cycle;

means for calculating within each contending data module a check code formed by logical ORing the aggregate code; and means for determining from the check code if only one data module is contending for the bus on a next consecutive clock cycle; and whereby access to the bus is given to a sole contending module.

6. The system of claim 5, wherein the generating means produces the aggregate code in duplicate to provide error detection.

7. The system of claim 5, wherein the generating means produces the aggregate code in triplicate to provide error correction.

8. The system of claim 5, wherein an error code is generated by the logical ANDing of the aggregate code.

* * * * *